United States Patent
Lilley

(10) Patent No.: US 8,976,027 B2
(45) Date of Patent: Mar. 10, 2015

(54) INFORMATION PROCESSING SYSTEM FOR CONSUMERS AT A STORE USING PERSONAL MOBILE WIRELESS DEVICES AND RELATED METHODS

(75) Inventor: Richard David Lilley, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 903 days.

(21) Appl. No.: 12/134,285

(22) Filed: Jun. 6, 2008

(65) Prior Publication Data
US 2009/0307091 A1 Dec. 10, 2009

(51) Int. Cl.
G08B 13/14 (2006.01)
G06Q 30/02 (2012.01)

(52) U.S. Cl.
CPC ............ *G06Q 30/02* (2013.01); *G06Q 30/0205* (2013.01); *G06Q 30/0224* (2013.01); *G06Q 30/0261* (2013.01)
USPC ................... 340/572.1; 340/539.13; 340/10.1; 235/383; 455/456.1; 705/14.66; 705/27.1

(58) Field of Classification Search
USPC ............. 340/572.1, 539.13, 10.1; 705/14, 26, 705/14.66, 27.1; 235/383; 455/456.1
See application file for complete search history.

(56) References Cited

U.S. PATENT DOCUMENTS

| 5,287,266 | A | 2/1994 | Malec et al. ................... 364/401 |
|---|---|---|---|
| 5,305,197 | A | 4/1994 | Axler et al. .................... 364/401 |
| 5,821,513 | A | 10/1998 | O'Hagan et al. ............... 235/383 |
| 5,910,769 | A | 6/1999 | Geisler ....................... 340/568.5 |
| 5,918,211 | A | 6/1999 | Sloane ............................ 705/16 |
| 6,011,487 | A | 1/2000 | Plocher .................... 340/825.49 |
| 6,067,445 | A * | 5/2000 | Gray et al. ........................ 455/45 |
| 6,317,718 | B1 | 11/2001 | Fano ................................. 705/1 |
| 6,381,583 | B1 | 4/2002 | Kenney ........................... 705/26 |
| 7,006,982 | B2 | 2/2006 | Sorensen ......................... 705/10 |
| 7,551,083 | B2 * | 6/2009 | Modes et al. ............... 340/572.1 |
| 2001/0024174 | A1 * | 9/2001 | Turner .......................... 342/465 |

(Continued)

FOREIGN PATENT DOCUMENTS

| EP | 1811426 A2 | 7/2007 |
|---|---|---|
| JP | 2001-331875 | 11/2001 |

(Continued)

OTHER PUBLICATIONS

Lantz, *Future Directions in Visual Display Systems*, ACM Siggraph Computer Graphics, pp. 38-42, May 1997.

*Primary Examiner* — Brent Swarthout
(74) *Attorney, Agent, or Firm* — Allen, Dyer, Doppelt, Milbrath & Gilchrist, P.A.

(57) ABSTRACT

An information processing system is for determining information about consumers at a store where at least some of the consumers may carry personal mobile wireless devices, and each personal wireless mobile device may transmit signals for identifying the respective consumer. The system may include at least one RF receiver device arranged about the store for receiving communications from the personal mobile wireless devices, and a processor coupled to the at least one RF receiver device. The processor may be for generating consumer position data of the consumers during movement about the store based upon communications from the respective personal mobile wireless devices to the at least one RE receiver device, and associating the consumer position data with respective identities of the consumers.

14 Claims, 11 Drawing Sheets

(56) References Cited

U.S. PATENT DOCUMENTS

| | | |
|---|---|---|
| 2002/0062245 A1 | 5/2002 | Niu et al. .................. 705/14 |
| 2002/0174025 A1* | 11/2002 | Hind et al. ................ 705/26 |
| 2003/0195800 A1* | 10/2003 | Peters ....................... 705/14 |
| 2004/0093265 A1 | 5/2004 | Ramchandani et al. |
| 2006/0010030 A1 | 1/2006 | Sorensen .................. 705/10 |
| 2006/0163349 A1* | 7/2006 | Neugebauer ............ 235/383 |
| 2006/0178932 A1* | 8/2006 | Lang ......................... 705/14 |
| 2007/0067220 A1 | 3/2007 | Godsey et al. ........... 705/23 |
| 2007/0174115 A1 | 7/2007 | Chieu et al. .............. 705/14 |
| 2007/0253595 A1 | 11/2007 | Sorensen ................ 382/103 |
| 2008/0005045 A1 | 1/2008 | Sorensen et al. ....... 705/500 |
| 2008/0067244 A1 | 3/2008 | Marks |
| 2008/0074264 A1* | 3/2008 | Sharpe et al. .......... 340/572.1 |

FOREIGN PATENT DOCUMENTS

| | | |
|---|---|---|
| JP | 2002056275 | 2/2002 |
| JP | 2007041642 | 2/2007 |
| WO | 99/14694 | 3/1999 |
| WO | 00/29994 | 5/2000 |
| WO | 02073828 A1 | 9/2002 |

\* cited by examiner

INFORMATION PROCESSING SYSTEM FOR CONSUMERS AT A STORE USING PERSONAL MOBILE WIRELESS DEVICES AND RELATED METHODS

FIELD OF THE INVENTION

The present invention relates to the field of information processing systems, and, more particularly, to systems and related methods for gathering and utilizing consumer information.

BACKGROUND OF THE INVENTION

The ability to collect and analyze information on consumer shopping behavior is valuable to a number of entities, such as product manufacturers, advertising agencies and stores. These entities use this data to determine behaviors or patterns of customers or consumers, such as how much time they spend shopping, what they buy, how often they stop, what displays they stop in front of, how many times they shop in the store before making a purchase, etc. These behaviors or patterns allow the entities to optimize their products, displays, advertising and promotions to improve product sales and, ultimately, profits. It also allows consumers to be segmented into categories related to their shopping behaviors and habits. A significant amount of money and effort is expended to collect and analyze such data.

Conventional techniques for identifying consumer market segments include, for example: market surveys; data mining credit card and customer loyalty card information; observer/counting shoppers and simple statistical analysis (e.g., X % of males buy Brand A tires every 12 months), etc. However, the are several potential drawbacks associated with such current market analysis approaches, such as: they are expensive and time consuming; data may not be integrated across stores, industries, regions and countries; not all customers may participate in the surveys; much of the information (such as number of times a customer visits before purchasing, time spent shopping in a store, etc) is difficult to determine; and it may be difficult to integrate information across market channels (e.g., stores, Internet, mail order).

Various systems have been developed in an attempt to more easily collect such information. One such example is set forth in U.S. Patent Pub. No. 2007/0067220 to Godsey et al., which is directed to a system for tracking a plurality of product containers in a store environment and generating a track through the store environment representative of a continuous path followed by each of the product containers to a point-of-sale location. The system includes the plurality of product containers and a plurality of identification tags, each of which is associated with and uniquely identifies one of the product containers. A plurality of sensors is provided in the store environment, each of which has a region associated therewith within which the identification tags are detected. At least one of the plurality of sensors has within its associated region the point-of-sale location. A processor is configured to receive location data from the plurality of sensors and generate the track therefrom.

Yet another similar system is set forth in U.S. Pat. No. 7,006,982 to Sorensen. This patent discloses a system and method for analyzing the behavior of a shopper within a shopping environment. The method determines the position of a product within the shopping environment, tracks a shopper path of a shopper through the shopping environment, via a wireless tracking system, and calculates a product-shopper proximity measure based at least in part on a physical distance of a shopper traveling along the shopping path from the position of the product.

U.S. Pat. No. 6,317,718 to Fano discloses a system that utilizes a Personal Digital Assistant (PDA)-based, Global Positioning System (GPS)-enabled information gathering agent to create a customized offer information summary for a user based on the location of the user and one or more items of interest. One or more items of interest are obtained from the user, and the physical location of the user is determined. A query based on the items of interest and the physical location of the user is then created, and an information network is queried utilizing this query. A customized offer is received from a retailer-based agent in response to the query, and the customized offer information associated with the items of interest and their locations relative to the physical location of the user is displayed.

Despite the potential advantages of such systems, further consumer information collection and utilization features may be desirable to benefit from consumer behavior patterns and tendencies in some applications.

SUMMARY OF THE INVENTION

In view of the foregoing background, it is therefore an object of the present invention to provide a system and related methods for gathering and utilizing consumer information.

This and other objects, features, and advantages are provided by an information processing system for consumers at a store. At least some of the consumers may carry personal mobile wireless devices, and each personal wireless mobile device may transmit signals for identifying the respective consumer. The system may include at least one RF receiver device arranged about the store for receiving communications from the personal mobile wireless devices, and a processor coupled to the at least one RF receiver device. The processor may be for generating consumer position data of the consumers during movement about the store based upon communications from the respective personal mobile wireless devices to the at least one RF receiver device, and associating the consumer position data with respective identities of the consumers.

More particularly, the processor may also be for initiating consumer-specific advertisements based upon the consumer position data and respective identities of the consumers. By way of example, the processor may initiate the consumer-specific advertisements as at least one of an email message and an SMS message to the respective personal mobile wireless devices. The information processing system may further include a product database for storing product position data for different products throughout the store. As such, the processor may further cooperate with the product database for associating the consumer identities with respective products potentially viewed by the consumers based upon the consumer position data and product position data.

Additionally, the information processing system may also include a consumer profile database for storing consumer profiles associated with respective consumers, and the processor may initiate the consumer-specific advertisements based upon the products potentially viewed by the consumers and their respective consumer profiles. Moreover, the consumer profiles may include at least one of consumer payment account profiles and consumer reward program profiles, for example.

The at least one RF receiver may include a plurality thereof spaced throughout the store. Also, the processor may determine the positions of the RF identification devices based upon at least one of an angle of arrival calculation, a time of arrival calculation, and a time difference of arrival calculation, for example. The information processing system may further include a wireless access terminal at the store cooperating with the processor for causing the personal mobile wireless devices, when in range thereof, to transmit signals for identifying the respective consumers. The processor may also cause the personal mobile wireless devices to transmit at a faster rate when in range. By way of example, the wireless access terminal may be a wireless local area network (LAN) access point, a cellular base station, etc.

An information processing method for consumers at a store is also provided, where at least some of the consumers carry personal mobile wireless devices, and each personal wireless mobile device transmits signals for identifying the respective consumer. The method may include arranging at least one RF receiver device about the store for receiving communications from the personal mobile wireless devices. The method may further include generating consumer position data of the consumers during movement about the store based upon communications from the respective personal mobile wireless devices to the at least one RF receiver device, and associating the consumer position data with respective identities of the consumers.

DETAILED DESCRIPTION OF THE PREFERRED EMBODIMENTS

Figure 1:
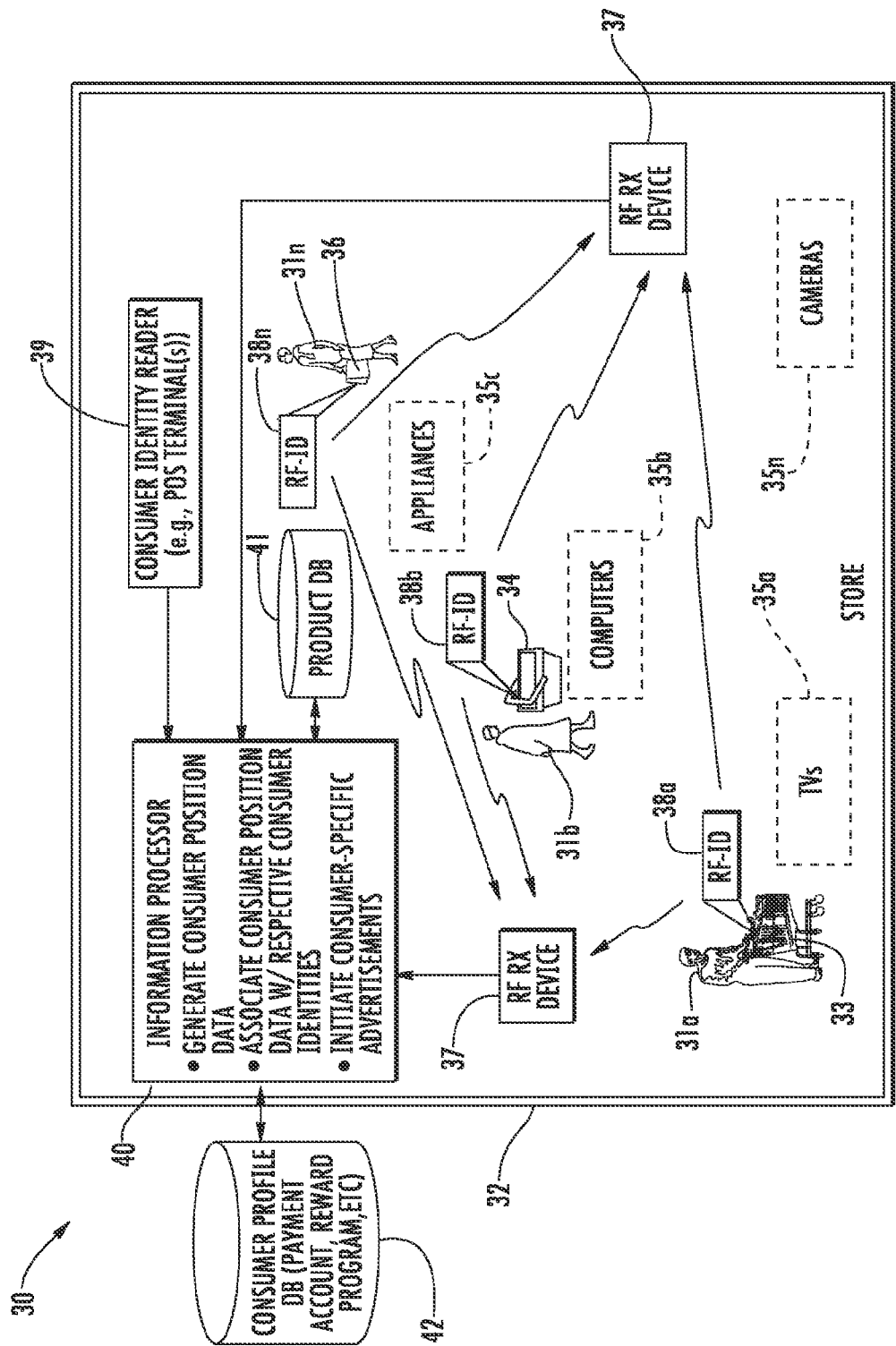
FIG. 1 is a schematic block diagram of an information processing system for consumers at a store in accordance with the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIGS. 1-6, an information processing system 30 for determining information about consumers 31$a$-31$n$ at a store 32 and associated method aspects are first described. The system 30 illustratively includes a plurality of radio frequency (RF) identification devices (RF-ID) 38$a$-38$n$. More particularly, in the illustrated example the RF identification devices 38$a$-38$n$ are electronic tags which are embedded or otherwise attached to shopping carts 33 and/or shopping baskets (e.g., hand baskets) 34 that consumers take when they enter the store 32 and use for carrying items to be purchased. In this way, each RF identification device 32 is temporarily associated with a respective consumer during movement about the store between different product areas 35$a$-35$n$, at Blocks 50-51. In some embodiments the RF identification devices 38$a$-38$n$ may be carried by other objects moved around the store 32 by consumers, such as shopping bags 36, electronic shopping aids (e.g., an electronic device with a store directory, calculator, etc.), or even on product packages, for example.

In the illustrated example, the store 32 is an electronics store which illustratively includes a television (TV) product area 35$a$, a computer product area 35$b$, an appliance product area 35$c$, and a camera product area 35$n$. However, other numbers and/or types of product areas may be used, and the system and methods of the invention may be applied to numerous other types of stores beside electronic stores.

The system 30 also illustratively includes one or more RF receiver devices 37 arranged about the store 32 for receiving communications (i.e., wireless signals) from the RF identification devices 38$a$-38$n$ (Block 52), and one or more consumer identity readers 39, such as point-of-sale (POS) terminals, for example, are also arranged about the store for reading respective identities of the consumers. By way of example, the identities of the consumers may be consumer payment account (e.g., credit/debit card or account) numbers, consumer reward program member numbers, etc., as well as other unique consumer identifiers that the consumers 31$a$-31$n$ provide at the consumer identity reader(s) 39, such as upon paying for their merchandise. Other forms of consumer identity readers could also be used, such as automated teller machines (ATMs), biometric readers, etc., as will be appreciated by those skilled in the art.

Additionally, an information processor 40, which may be located at the store 32 or remotely located, cooperates with the RF receiver device 37 for generating consumer position data of the consumers during movement about the store. More particularly, this is done based upon communications from the respective RF identification devices 38$a$-38$n$ to the RF receiver device(s) 37, at Blocks 52-53, as will be discussed further below. The processor 40 also cooperates with the consumer identity reader(s) 39 to read respective identities of consumers, and the consumer position data is associated with respective identities of the consumers, at Blocks 54-55. Knowing the consumer position data and respective identities of the consumers allows the information processor 40 to advantageously initiate consumer-specific advertisements for the consumers, at Block 56, as will also be discussed further below, thus concluding the method illustrated in FIG. 5 (Block 57). By "initiating" the advertisements it is meant merely that the processor 40 may make available or provide the pertinent information for the advertisement (e.g., lists, etc.), and need not necessarily perform the functions of an email/SMS server, form generation, etc., used to generate and send the advertisements, although one or more of these functions could be performed by the processor in some embodiments.

By way of example, the processor 40 may be implemented with a general-purpose computer or microprocessor and associated memory and software. Moreover, although wired connections are illustratively shown between the processor 40 and RF receiver devices 37 in the present example, one or more of the communication links therebetween may also be wireless in some embodiments. The processor 40 may integrate the information provided by the EF receiver devices 37 to a desired level of accuracy, and store them in a memory or database, for example (not shown). It should be noted that the position determining operations may be shared or distributed between the processor 40 and the RF receiver devices 37, as will be appreciated by those skilled in the art. Moreover, the various operations of the processor (e.g., initiating advertisements, generating reports, etc.) may also be distributed across more than one physical processing device, which need not be co-located (i.e., they may be remotely located from one another and connected via a network such as a LAN or the Internet, for example).

More particularly, the system 30 further illustratively includes a product database (DB) 41 for storing product position data for different products throughout the store. In other words, the locations of the various products are maintained in the product database 41. This could be done manually by store personnel as products are positioned in different locations about the store 32 from time to time, or it may also be done using RF identification tags 31 for product inventory/location so that the processor 40 can "automatically" determine their whereabouts at the store. Using an RF identification device 38 and a bar code scanner, for example, the location of each product in a store can be established during inventory measurements. This may advantageously improve the position accuracy of products within the store. Moreover, the system 30 may be calibrated for different stores to improve accuracy and identify product locations. For example, to improve the accuracy of the function that determines the position of the RF identification tags 31, fixed tags may be placed at known locations throughout the store 32. The fixed tags serve as calibration points for the system 30 and advantageously make the system more accurate, as will be appreciated by those skilled in the art.

Figure 6:
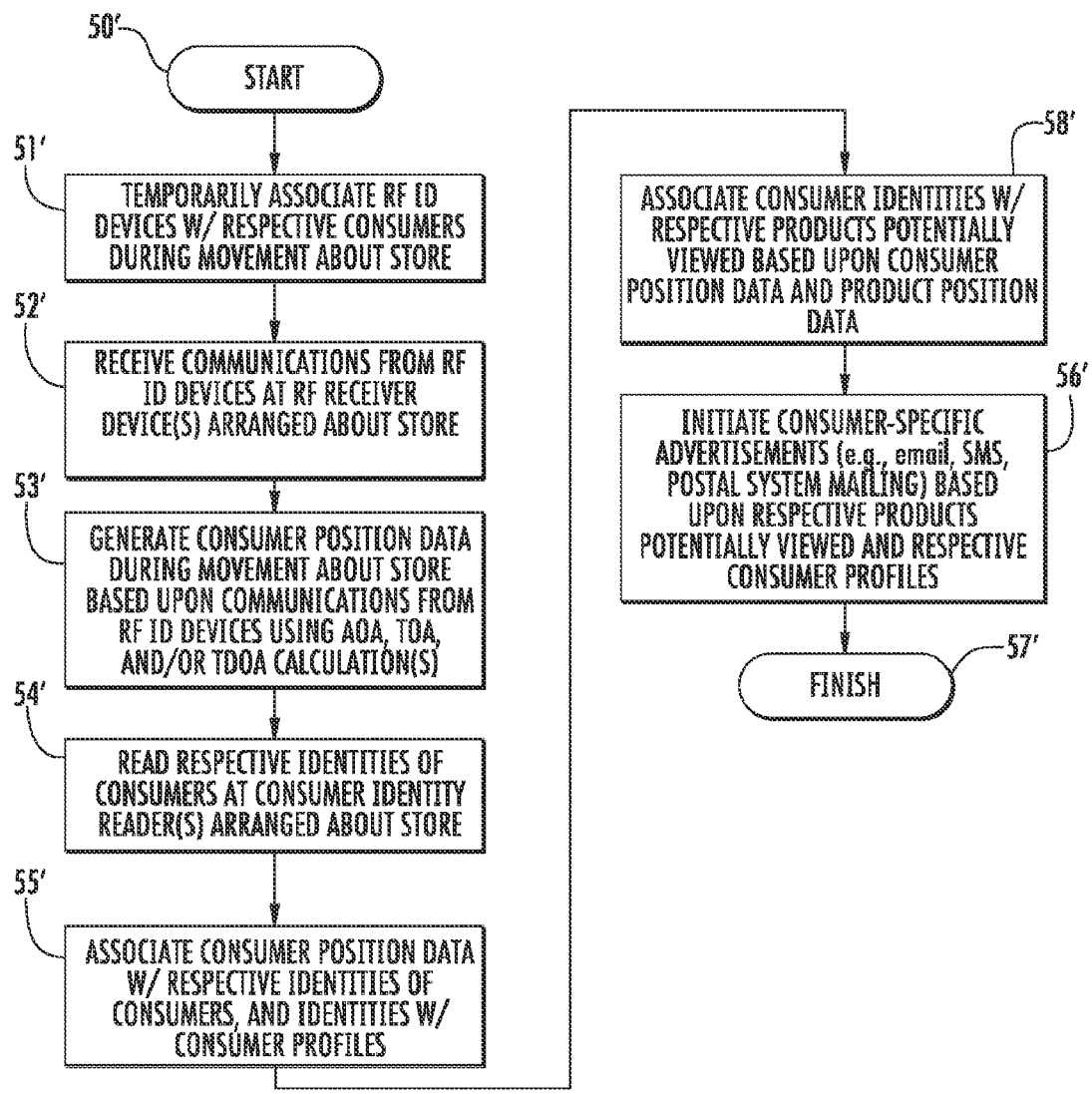

By knowing where the various products are located about the store 32, and by determining the identities of consumers and associating these identities with the particular locations where the consumers have moved about the store, the processor 40 may advantageously determine which products given consumers have potentially looked at in (or potentially outside) the store. That is, the processor 40 cooperates with the product database 40 to associate the consumer 31 identities with respective products potentially viewed by the consumers based upon the consumer position data and product position data, at Block 58' (FIG. 6).

More specifically, based upon the proximity of consumers 31 to various products as they move about the store 32, as well as the duration consumers spend in a given product area 35, the processor 40 may advantageously make informed estimates as to consumers' interests in particular products. By way of example, the processor 40 may determine that a consumer took little or no interest in a particular type of product (e.g., passed it by quickly), took some interest in the product type (e.g., by stopping briefly in the section), or took an active interest in the product type (e.g., spent a relatively long time in a product area and/or moved slowly through the area), etc.

Of course, other factors and approaches for estimating consumer interest in given products may be used in various embodiments.

It should be noted that the granularity of the consumer interest association to particular products or product types may vary in different embodiments as well. That is, for relatively accurate RF identification devices 38 and RF receiver devices 37 that provide position estimates to within a few feet, for example, the consumer interest association may potentially be made to an individual product type or group. For example, a consumer may pause on the video camera side of a camera display as opposed to the digital camera side. As such, it may be concluded that the consumer is interested specifically in video cameras rather than cameras in general. Accordingly, a consumer-specific advertisement for this consumer may include a coupon for video cameras specifically. However, a more general association of interest with cameras in general could also be made, i.e., the association need not be made to a specific product type (i.e., video cameras vs. digital cameras) in all embodiments, as will be appreciated by those skilled in the art. Moreover, in some applications, even further granularity is possible, such as if the consumer pauses at an end cap with a single product thereon (e.g., one specific video camera, as opposed to a section with several different types of video cameras).

A consumer profile database 42 is also illustratively included in the system 30 for storing consumer profiles associated with respective consumers. More specifically, the consumer profile database 32 may include consumer payment account profile data (e.g., credit card account holder data, such as name, contact information, etc.), consumer reward program profiles (e.g., name, contact information, product preferences, etc.). The processor 40 may therefore initiate the consumer-specific advertisements based upon the respective products potentially viewed by the consumers and their respective consumer profiles.

More specifically, the processor 40 may advantageously associate consumer identities with consumer profiles (e.g., a credit card number with the card holder's account profile) (Block 55'), and initiate targeted advertisements for products potentially viewed by consumers through email messages to respective email addresses, text/SMS messages to respective cellular phone numbers, postal system mailings (e.g., U.S. Postal Service mailings) to physical home/office addresses, etc., at Block 56', although other suitable advertising mediums may also be used.

Based upon the known location of products within the store and movement of customers relative thereto, the processor 40 may also advantageously generate various reports, statistics, and models for use by store personnel. By way of example, such reports/statistics may relate to one or more of the following: how much time consumers spend shopping; how often consumers stop; what displays consumers are stopping in front of; enhanced products selection and location within stores; effectiveness of displays; targeted advertising and promotions; segmentation of consumers into categories related to shopping behaviors, etc.

In the embodiment illustrated in FIG. 1, a plurality of RF receiver devices 37 are illustratively included for receiving signals from the RF identification devices 38. As such, the processor 40 may generate the consumer position data by determining the positions of the RF identification devices based upon one or more algorithms or calculations, including angle of arrival (AOA), time of arrival (TOA) and time difference of arrival (TDOA), for example, to determine the position. The position estimate may be relatively accurate, to within a few meters or less in some embodiments, although other accuracy levels may also be used in some embodiments. Other suitable position determining approaches may be used in other embodiments (e.g., GPS, etc.), as will be appreciated by those skilled in the art.

Figure 2:
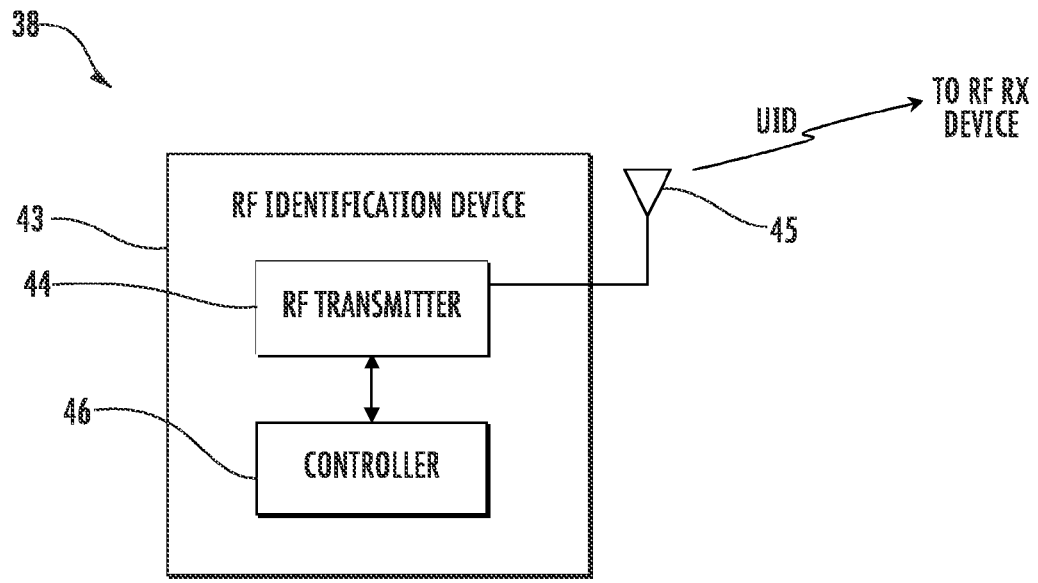
FIGS. 2 through 4 are schematic block diagrams of various embodiments of RF identification devices for use in the system of FIG. 1.
Figure 3:
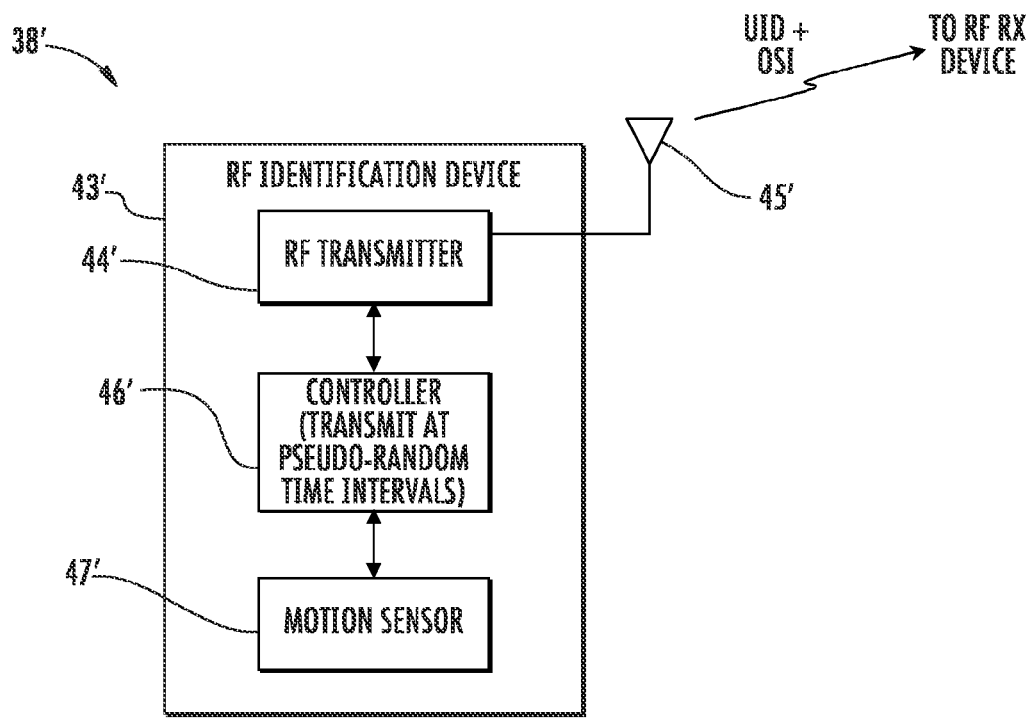

One exemplary RF identification device 38 is shown in FIG. 2 and illustratively includes a substrate or housing 43, an RF transmitter 44 and associated antenna(s) 45, and a controller 46. The controller 46 cooperates with the RF transmitter 44 to transmit a unique identification (UID) number to the RF receiver devices 37, as will be appreciated by those skilled in the art. The substrate or housing 43 may advantageously be sized or otherwise adapted to be carried by shopping cars 33, baskets 34, bags 36, products, etc. In this regard, the RF identification device may be considered as a relatively small RF identification "tag" that in some embodiments may be positioned or embedded within a cart, basket, etc., so as to be substantially undetectable to consumers.

The controller 46 may be implemented using various components such as digital and/or discrete components, memory, software, etc., and the RF identification device 38 may also include other components such as batteries, etc., as will be appreciated by those skilled in the art. The RF identification device 38 may operate on one or more suitable RF communications frequencies approved for use in the above-noted applications, as will also be appreciated by those skilled in the art. More particularly, the system 30 may operate at various RF frequency ranges authorized by the FCC or other regulatory bodies, including both unlicensed ISM and licensed bands. It some embodiments it may be desirable to have the RF identification devices 38 operate in unlicensed ISM bands, where FCC or other regulator licensing or approval is not required. The RF identification devices 38 will preferably transmit at a relatively low power level to avoid interfering with other RF electronic devices, and advantageously conserve battery power, as will be further appreciated by those skilled in the art.

The RF identification devices 38 may operate in various modes, one of which is a proactive mode wherein the controller 46 causes the transmitter 44 to transmit or broadcast the UID at predetermined or intermittent intervals. In accordance with one proactive mode embodiment shown in FIG. 3, the device 38' also includes a motion sensor 47' coupled to the controller 46, which allows the controller to change a transmission repetition rate of the RF transmitter 43' based upon detected motion. Thus, battery power is conserved by transmitting less often when the RF identification device 38' is at a standstill, such as when a shopping cart 33, basket 34, etc., is in a cart/basket return area (i.e., and not associated with a customer), or when a consumer 31 remains in a given location for an extended period looking at a product, for example. Moreover, in the proactive mode, if a relatively large number of RF identification devices 38' are in use, the controller 46' may also advantageously be configured to cause the RF transmitter 44' to transmit at pseudo-random time intervals, so that the transmissions are less likely to overlap and therefore interfere with one another, as will be appreciated by those skill in the art.

In accordance with one exemplary implementation of the passive operating mode RF identification device 38', each device generates a signal at pseudo-random times (e.g., every 0.1 to 30 seconds), although other time periods may also be used. Again, the pseudo-random time spacing prevents the RF identification devices 38' from transmitting at the same time, which may result in errors in the position estimate. The power consumption of the RF identification device 38' is generally proportional to the time it transmits. Hence a trade-off results, in that the more frequent the transmission, the better the position accuracy, but the more power the RF identification device 38' consumes (which requires more frequent battery changes or device replacement).

The motion sensor 47' when included in the RF identification device 38' may therefore advantageously help conserve power. When the cart 33, basket 34, etc., is not moving, the RF identification device 38' transmits at a relatively slow rate (e.g., every thirty seconds). When the cart is moving (i.e., a consumer is shopping), the transmission rate may increase (e.g., every second) to improve position accuracy. By way of example, the signals transmitted by the RF identification device 38' may be chirped with a device UID number modulated on a carrier frequency. Another approach is to use a direct sequence spread (i.e., using a short PN sequence) with a modulated device UID number, as will be appreciated by those skilled in the art.

Figure 7:
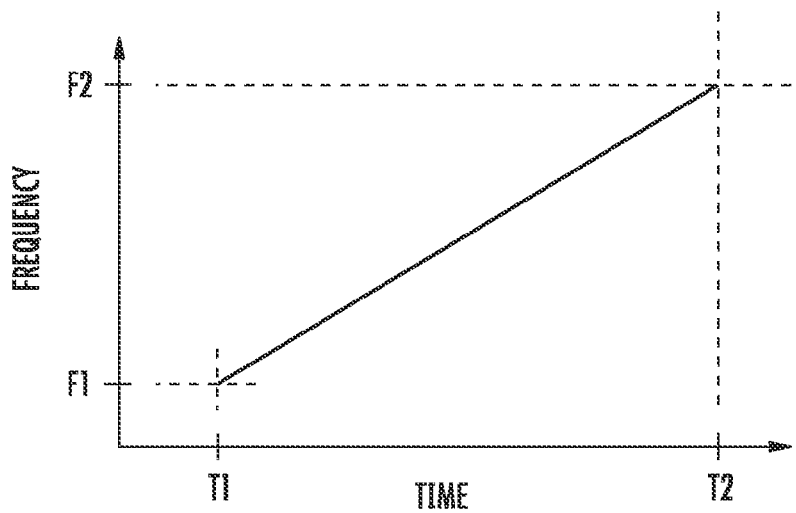
FIG. 7 is a graph of frequency vs. time for a chirped signal which may be used by the RF identification devices of FIGS. 2-4.
Figure 8:
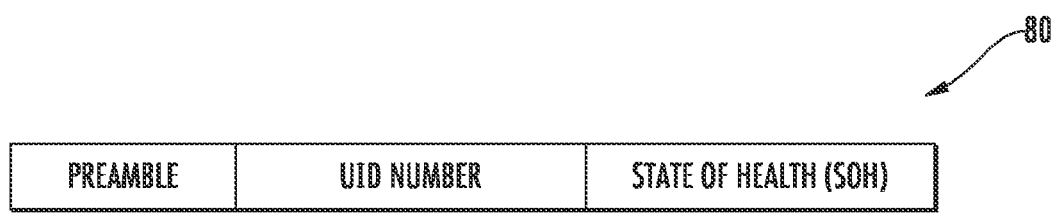
FIG. 8 is a schematic diagram of an exemplary data packet that may be transmitted by the RF identification devices of FIGS. 2-4.

Referring to FIG. 7, a chirped signal starts at one RF frequency (F) and proceeds to a stop frequency (F2) over a specified time interval (i.e., T1 to T2). The accuracy of the position estimate is a function of the chirp bandwidth (where the chirp bandwidth=F2−F1) and the time over which it sweeps from F1 to F2 (i.e., T=T2−T1). Each RF identification device 38' may transmit a packet 80 including a preamble to aid the RF receiver device 37 in detecting the signal (FIG. 8). After the preamble, the device UID number (e.g., a serial number) distinguishes which device sent the transmission.

In the illustrated embodiment, the controller 46" also causes the RF transceiver 48" to transmit an operational status indicator (OSI) indicating a state of health (SOH) of the RF identification devices 38' to the RF receiver device(s) 37. The optional SOH information may be appended to the preamble and UID as illustratively shown in FIG. 8 to identify RF identification devices 38' that need new batteries, service, etc., as will be appreciated by those skilled in the art.

Figure 9:
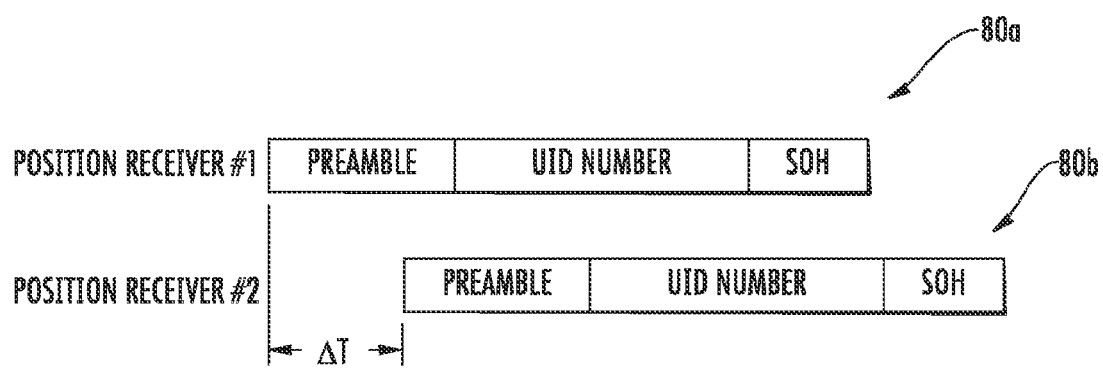
FIG. 9 is a schematic diagram showing the data packet of FIG. 8 as received by different RF receiver devices of the system of FIG. 1 and a time difference therebetween for use in position determination.
Figure 10:
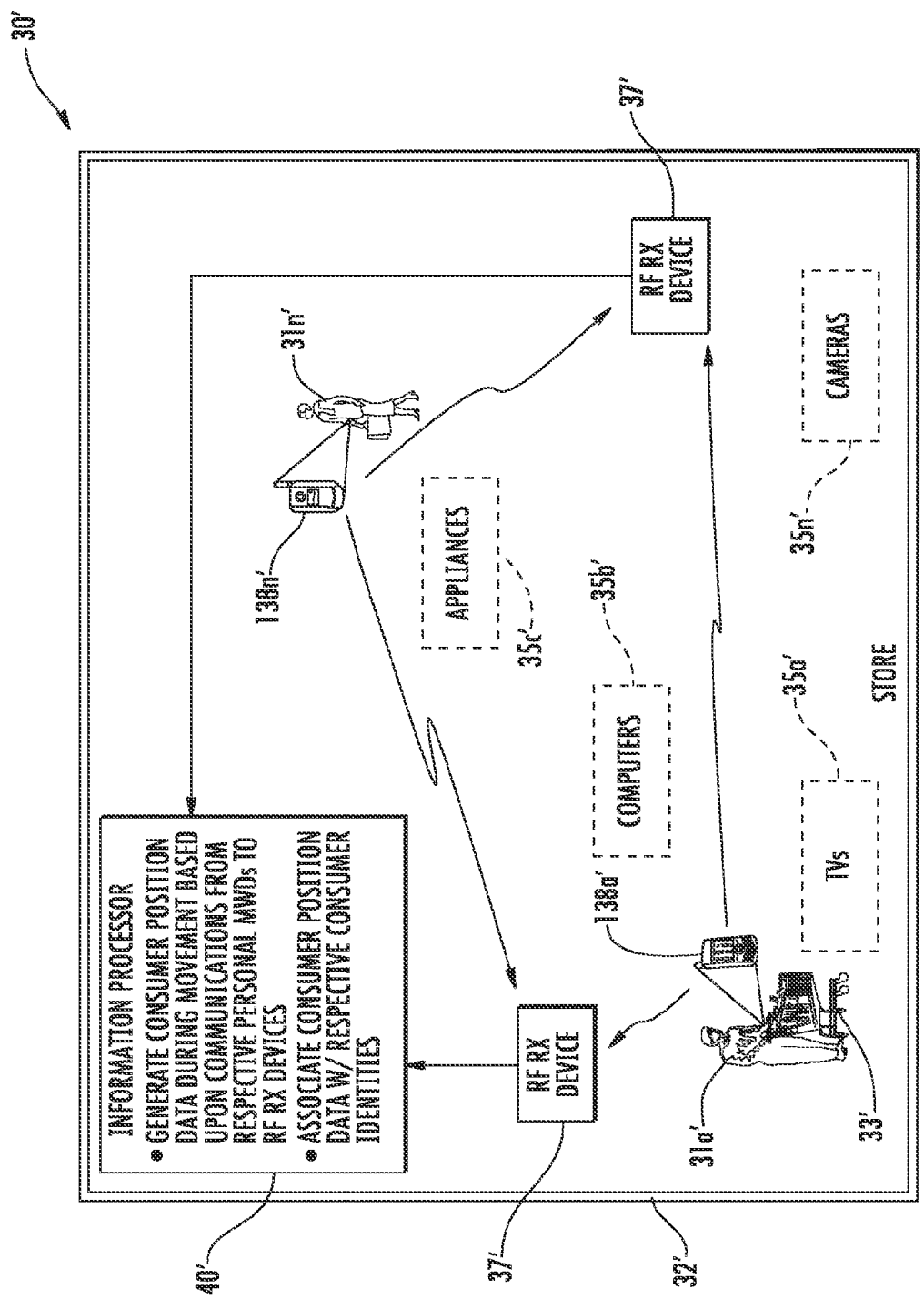
FIG. 10 is a schematic block diagram of another consumer information processing system in accordance with the invention.
Figure 11:
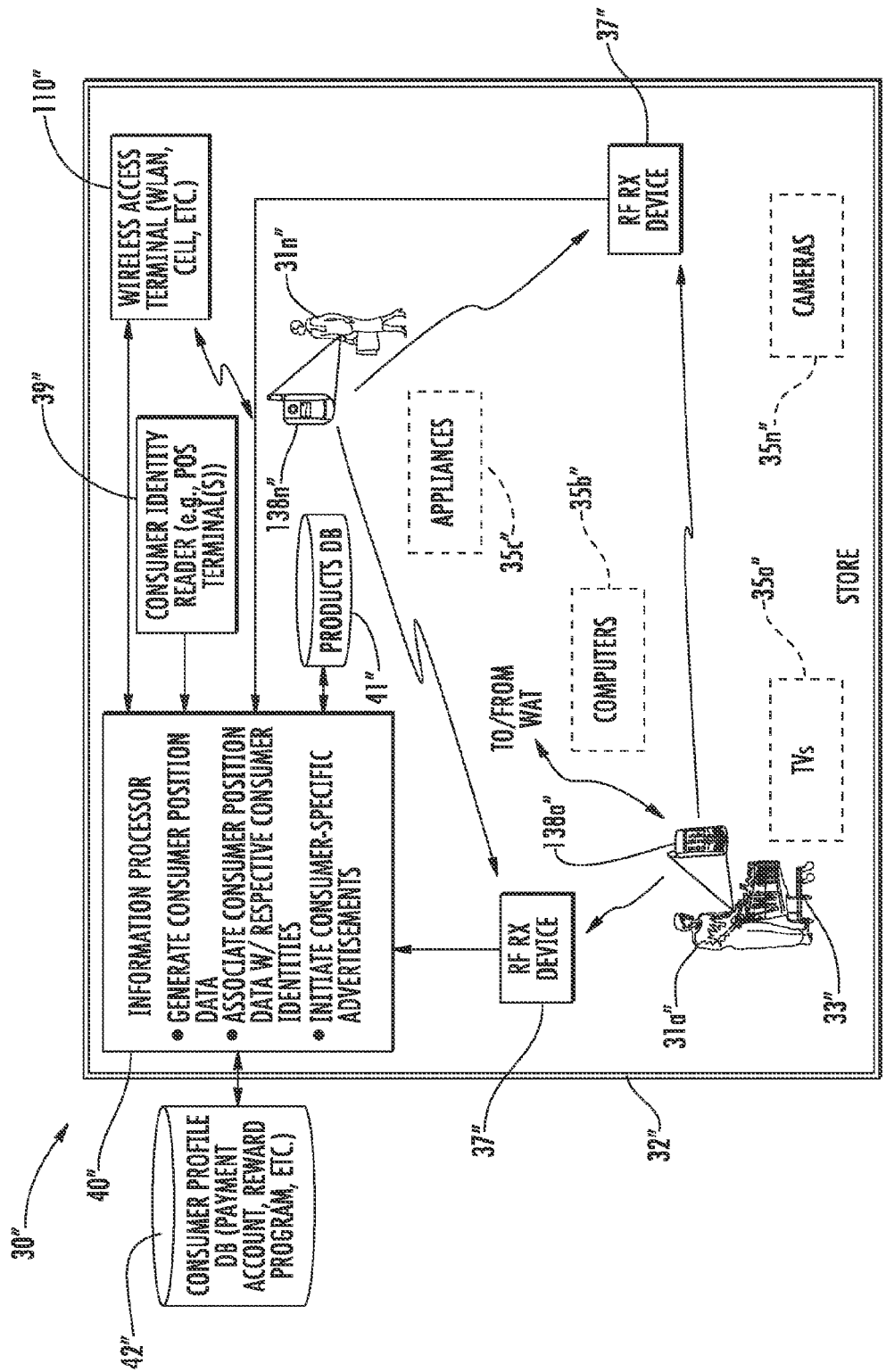
FIG. 11 is a schematic block diagram of an alternative embodiment of the system of FIG. 10.
Figure 12:
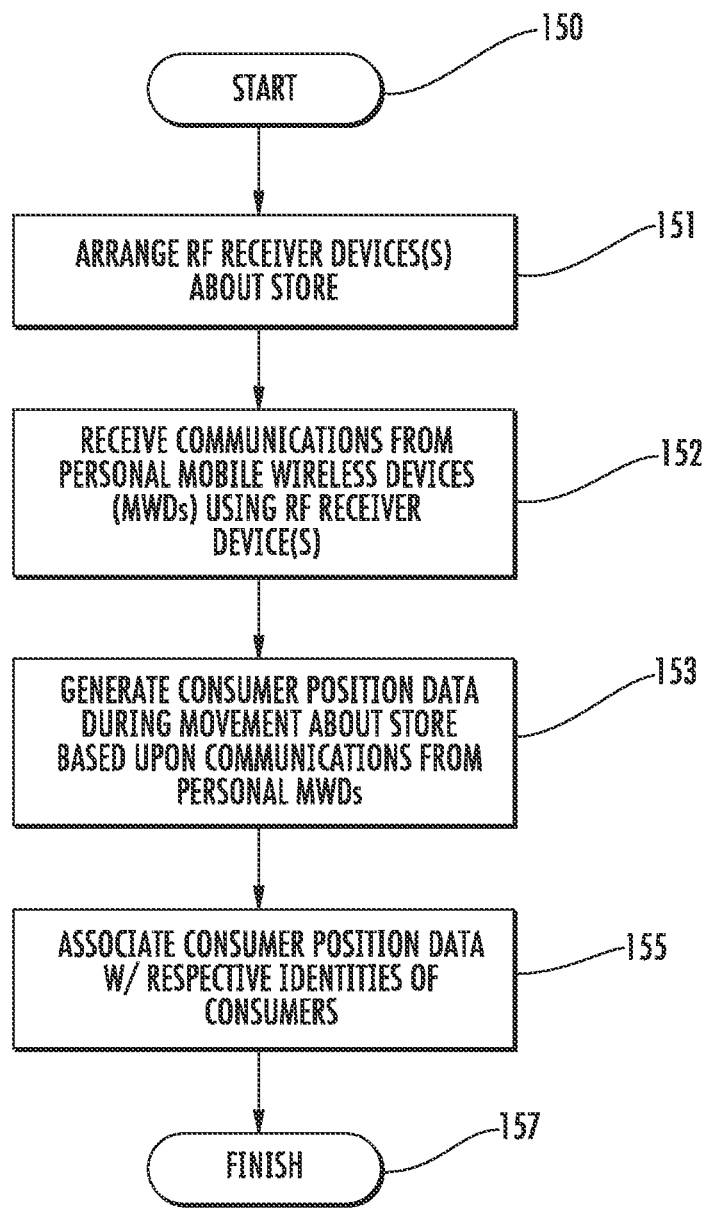
FIGS. 12 and 13 are flow diagrams illustrating further consumer information processing method aspects in accordance with the invention.
Figure 13:
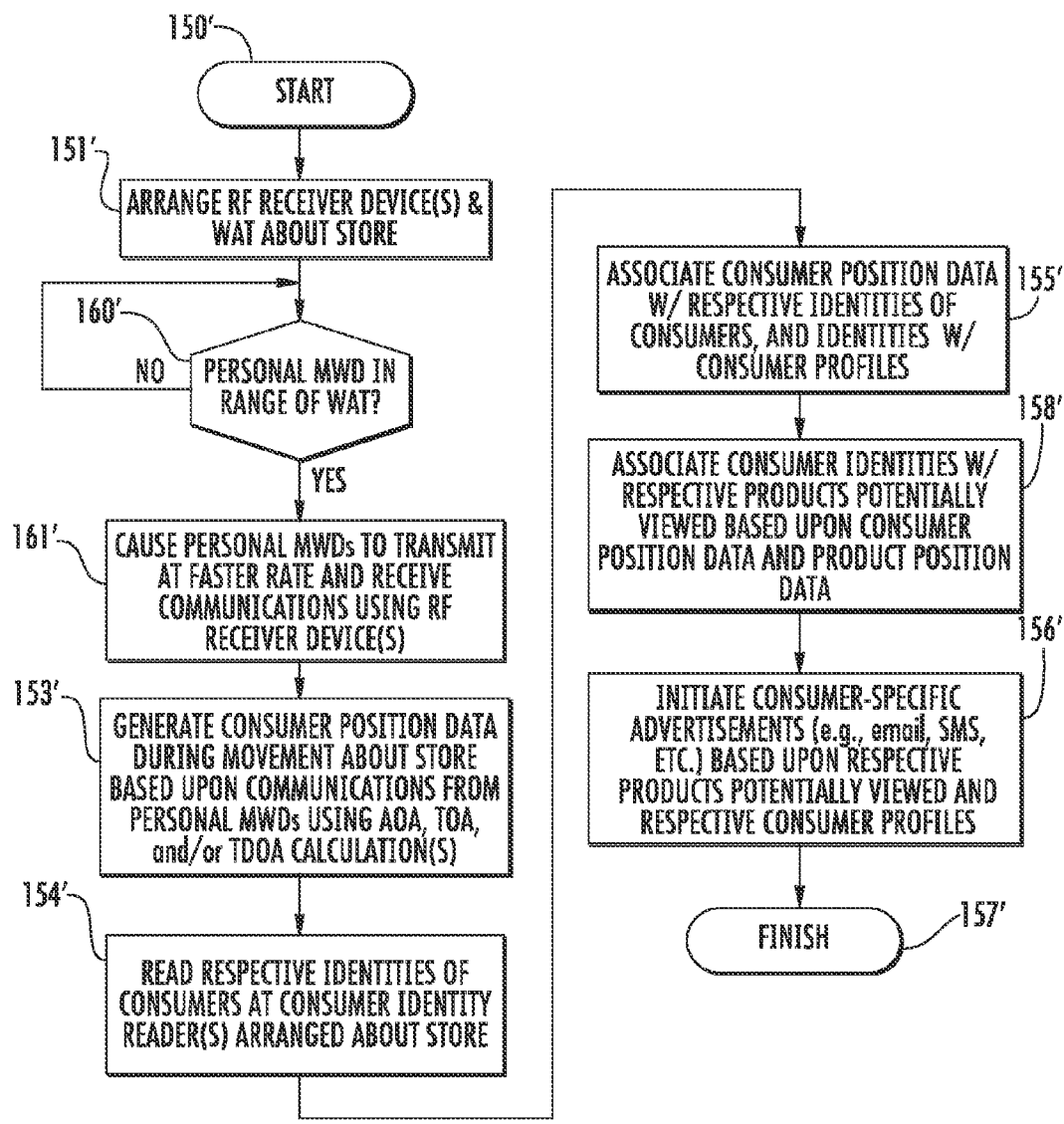

Turning additionally to FIG. 9, two or more RF receiver devices 37 advantageously determine position data using an AOA calculation by identifying the intersection of the two estimated received signal paths, as will be appreciated by those skilled in the art. Generally speaking, the more RF receiver devices 37 there are in the store 32, the more accurate the position determination may be. The RF receiver devices 37 may also advantageously use TDOA or TOA, and estimate the RF identification device 38' position based on the difference in arrival times of the device transmissions, as will also be appreciated by the skilled artisan. By measuring the difference between arrival times of the signal packets 80*a*, 80*b* (which are the same signal but are indicated with different reference numbers in FIG. 9 to indicate that they are received by different RF receiver devices 37) arrive at the different RF receiver devices (i.e., ΔT), the system 30 may more accurately determine the tag position (see FIG. 4). Using a combination of AOA and TDOA may provide even more accurate position estimates, although this is not required in all embodiments.

Figure 4:
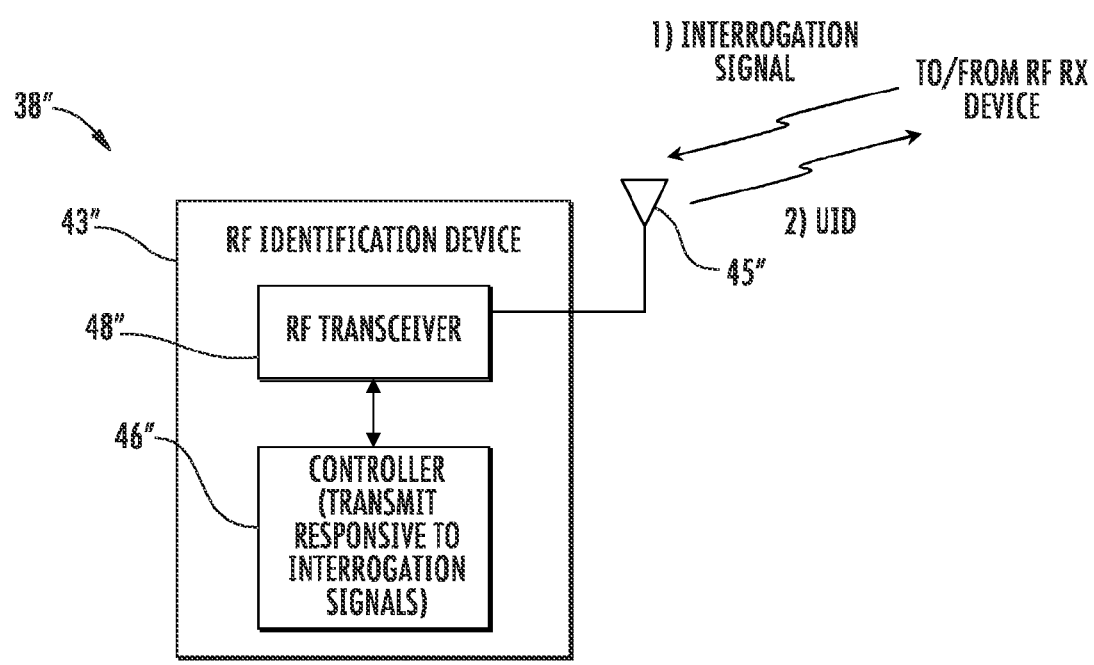
Figure 5:
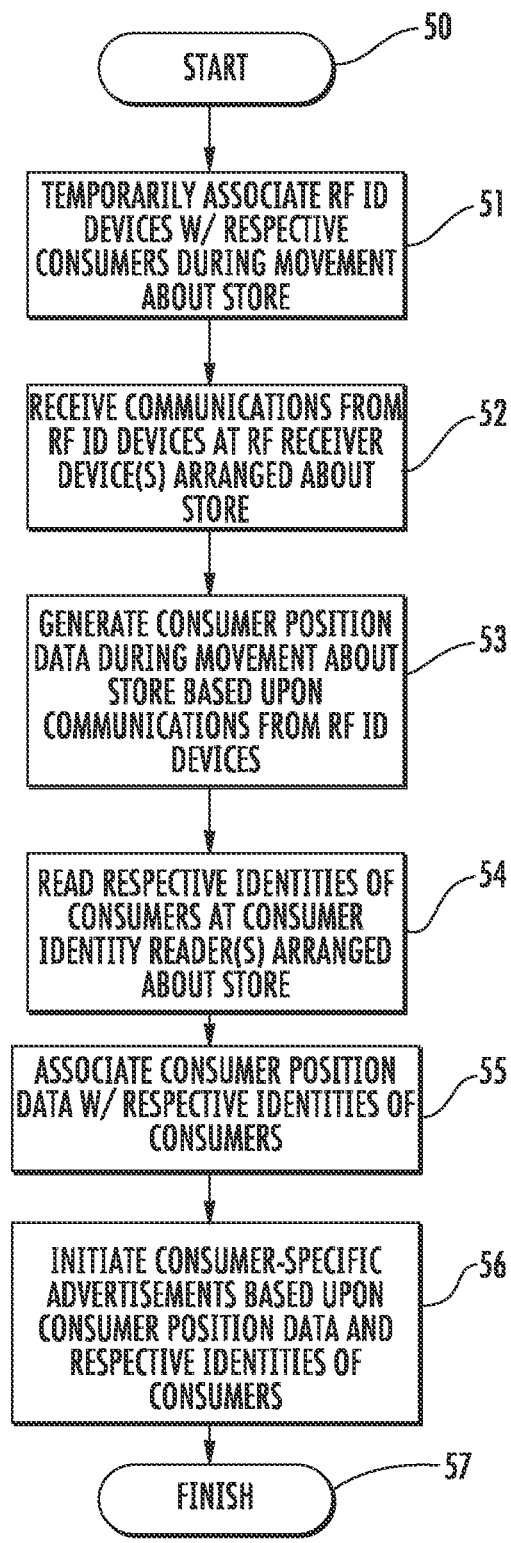
FIGS. 5 and 6 are flow diagrams illustrating consumer information processing method aspects in accordance with the invention.

Another operational mode, namely a reactive mode, for an RF identification device 38" is now described with reference to FIG. 4. In a reactive mode, the RF receiver device(s) may, in addition to receiving UIDs from the RF identification devices 38", also transmit interrogation signals thereto. As such, the controller 46" will cause the RF transmitter 48" to transmit based upon receipt of the interrogation signals. Stated alternatively, the controller 46" waits until the RF identification device 38" is interrogated or prompted by an RF receiver device 37" to provide its UID before doing so, as opposed to proactively transmitting its UID on a schedule (or pseudo-randomly, etc.). To this end, in the illustrated embodiment an RF transmitter is also included with the RF receiver (shown as a single transceiver 48" in FIG. 4). By way of example, the controller 46" may cause the transceiver 48" to retransmit the received interrogation signal with information that allows the RF receiver devices 37 to determine their position. The RF receiver devices 37 may include a power supply, receiver and associated antenna(s) to receive (and optionally transmit in a reactive operational mode) signals, receiver (and optionally transmitter) circuitry, and a controller (not shown), for example, as will be appreciated by those skilled in the art.

In accordance with one exemplary implementation of the reactive operational mode, each RF receiver device 37 interrogates the RF identification devices 38" throughout the store 32 by transmitting the UID number in a chirped waveform, as discussed above. The RF identification device 38" receives the transmitted signal and responds by repeating the transmitted signal, along with an optional SOH field for battery level, etc. The RF receiver device(s) 37 then uses TOA, etc., to determine the distance of the tag by measuring the time ($\Delta T$) between its transmission and the response of the RF identification device 38". By using two or more RF receiver device 37 range estimates, the RF identification device 38" position may be fairly accurately determined. The RF receiver devices 37 may also include AOA, TDOA, etc., measurements/calculations to improve the position estimate, if desired in some embodiments.

Turning now additionally to FIGS. 10-13, an alternative embodiment of the information processing system 30' is now described. Generally speaking, instead of the above-described RF identification devices 38, the system 30' advantageously determines consumer movement throughout a store 32' from personal mobile wireless devices 138a'-138n' carried by the consumers 31a'-31n', such as cellular and/or wireless local area network (LAN) devices. As will be appreciated by those skilled in the art, such personal mobile wireless devices typically transmit signals for identifying the respective consumer, such as to a cellular base station or wireless LAN access point, for example. Other examples of personal mobile wireless devices 138a'-138n' include portable or laptop computers, personal digital assistants (PDAs), etc., which are also typically identified by a unique MAC address contained in the header of their transmissions, as will be appreciated by those skilled in the art.

As discussed above, the system 30' illustratively includes one or more RF receiver devices 37' arranged about the store 32' (Blocks 150-151) for receiving communications from the personal mobile wireless devices 138a'-138b' (Block 152), and the information processor 40' is coupled thereto. In the present embodiment, the processor 40' generates consumer position data for the consumers 31a'-31n' during movement about the store 32' based upon communications from the respective personal mobile wireless devices 138a'-138n' to the RF receiver device(s) 37' (Block 155), and associates the consumer position data with respective identities of the consumers, at Block 155, which concludes the method illustrated in FIG. 12 (Block 157).

More particularly, the processor 40' may also initiate consumer-specific advertisements based upon the consumer position data and respective identities of the consumers, at Blocks 154', 156', 158', and 156', as discussed above. Again, this may be done in cooperation with the product database 41" and consumer profile database 42" (FIG. 11), and the position data may be generated based upon TOA, AOA, TDOA, etc., calculations/algorithms (Block 153'). With personal mobile wireless devices 138a'-138n', consumer-specific advertisements in the form of email messages and/or SMS text messages may be particularly advantageous, as they may be received by consumers 31" in a relatively short time, and potentially while a consumer is still in the store 32' making a purchasing decision. However, traditional postal service mailings, etc., may also be used, as discussed above.

It should be noted that in this exemplary embodiment, the consumer profile database 42" could take the form of a network subscriber database (e.g., a cellular system subscriber database), and an association with data from a credit account, reward program account, etc., need not be made in all embodiments, although this may be desirable. Moreover, the association of respective personal mobile wireless devices 138a'-138n' with consumer profiles may be performed with or without a consumer identity reader 39" (i.e., the consumer could be identified before checking out based upon cell phone provider records, for example).

In accordance with one embodiment, a wireless access terminal (WAT) 110" may be included at the store 32" which cooperates with processor 40" for causing the personal mobile wireless devices 138a'-138n' when in range of the WAT to transmit signals for identifying the respective consumers. Moreover, the processor 40" may also cause the personal mobile wireless devices 138a'-138n' to transmit at a faster rate when in range of the WAT 110", at Block 161'. By way of example, the WAT 110" may be a wireless LAN access point, a cellular base station, etc.

More particularly, as consumers 108" enter the store 32" with their personal mobile wireless devices 138" and begin shopping, the devices are "forced" to register with the WAT 110', which in a cellular embodiment may be a fempto or pico cell base station, for example, and they accordingly begin transmitting frequent short messages. Two or more RF receiver devices 37" located within the store 32" receive these transmissions, detect the unique electronic serial number (ESN) or other electronic ID number (EID) of the device 138", and begin tracking its location. The unique ESN or EID allows the RF receiver devices 37" to uniquely identify consumers each time they enter and leave the store. This ability to uniquely identify each personal mobile wireless device 138" allows the system 30" to advantageously aggregate and improve the behavioral information on the consumer.

The position information from the RF receiver devices 37" is passed to the processor 40", which may aggregate the position information and generate the tracking/position information. After collecting the tracking information, an analysis may be performed to determine where customers 31" travel within the store 32" and what products they are evaluating. This analysis may be used locally by the store 32" or further aggregated with information from other stores to generate accurate models of each consumer's behavior.

In some embodiments, the store 32" may offer the ability for consumers 31" to register (i.e., provide their profile and respective personal mobile wireless device 108" ESN/EID) in exchange for targeted special offers, etc. If the store 32" recognizes that a particular consumer 31" has made several visits to a particular product area (e.g., the HDTV display area), an "instant" SMS/email message may be sent to the consumer offering a discount if he/she purchases an HDTV within the next thirty minutes (or other duration), for example. Of course, numerous other forms of promotions offers could also be provided, and those provided herein are merely exemplary for purposes of describing possible aspects of the invention.

When aggregated with other tracking data, the system 30" can generate a more accurate model of consumers' shopping behavior. This improved model allows better segmentation and targeting of ads and other information that might interest the consumer, as will be appreciated by those skilled in the art. When a consumer 31" makes a purchase, the system 30" may detect the consumer's location at the consumer identity reader 391' (e.g., POS terminal). This allows additional information (credit card numbers, customer loyalty card information, etc.) to be collected and integrated into the model.

In accordance with one exemplary cellular embodiment, when the consumer enters the store, the WAT 110" (e.g., fempto cell base station) forces the consumers cell phone 108" to transition from its current cellular provider. Once connected to the fempto cell base station, the cell phone 108" is also forced to transmit more frequently than normal. The fempto cell base station provides call services to the consumer 31" while being tracked within the store 32". This frequent transmission rate is used to improve the position estimates made by the RF receiver devices 37".

The RF receiver devices 37" track the cell phone 108" as it moves about the store 32" (i.e., inside and potentially outside as well). As the consumer 31 moves about the store, a position track is captured. This information is passed to the processor 40", which may compare the ESN/EID to a corresponding database. Based on behavioral rules defined by the store 32", special text message offers may be sent to the consumer, etc. When a consumer 31" leaves the store area, the processor 40" detects the departure and instructs the fempto cell base station to return the cell phone to the normal cell provider. This technique is used for a variety of phone standards, including AMPS, IS-136, GSM, CDMA, UMTS, and COMA-2000, for example, as will be appreciated by those skilled in the art.

In the case of cell phones or other portable devices that implement wireless LAN capabilities, such as WiFi (IEEE 802.11) and WiMAX (802.16), for example, the WAT 110" may be a wireless access point that causes the portable device 108" to periodically transmit, similar to the cellular phone embodiment discussed above. Again, the RF receiver devices 37" track the device 108" based upon a unique identifier, such as a MAC address, for example. The remaining system 30" operations for wireless LAN embodiments may be similar to those discussed above.

By monitoring the electronic serial number (ESN), which is unique to each personal mobile wireless device 138', 138", many of the above-described market analysis problems may be alleviated. For example, this approach may advantageously have one or more of the following benefits: it is passive (i.e., no surveys, etc., are required by the consumer to collect information on their shopping preferences); it may provide data to generate relatively precise models of consumer behavior, and thus provide better models and understanding of existing segments or identication of new ones; a large number of consumers have personal mobile wireless devices (including segments often of particular interest, such as teenagers/children); data may be collected on a continuous basis with relatively high success rates; it may provide near real time analysis; consumers may be engaged with consumer-specific advertisements, etc., in near real time (i.e., text message special offers, coupons to encourage immediate purchases, etc.); it may provide local, regional, national, and/or world-wide collection capabilities; data may be aggregated across stores, across businesses (stores, malls, Web, mail order), across geographical boundaries, ethnically, globally, etc.; the data may be integrated with other consumer data sources (such as credit card purchasing data, on-line shopping, ATM transactions); and privacy may be user-controlled (no monitoring, passive monitoring, active exchange, messaging, etc.). In some embodiments, the consumer 31 may even be rewarded for sharing his/her "behavior," such as with extra discounts, giveaways, etc. Moreover, one or more of these benefits may also be provided by the system 30, as will be appreciated by those skilled in the art. It should be noted that both RF identification devices 38 and personal mobile wireless devices 138 may be used in a same implementation to provide enhanced consumer data collection features, if desired.

Additional features of the invention may be found in a co-pending patent application filed concurrently herewith and assigned to the Assignee of the present invention entitled INFORMATION PROCESSING SYSTEM FOR A STORE PROVIDING CONSUMER-SPECIFIC ADVERTISEMENT FEATURES AND RELATED METHODS, Ser. No. 12/134,274, the entire disclosure of which is hereby incorporated herein in its entirety by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An information processing system for consumers at a store, at least some of the consumers carrying personal mobile wireless devices and each personal wireless mobile device transmitting signals for identifying the respective consumer, the information processing system comprising:

at least one RF receiver device arranged about the store for receiving communications from the personal mobile wireless devices;

a wireless access terminal at the store;

a product database configured for storing product position data for different products throughout the store; and a processor coupled to said at least one RF receiver device, said wireless access terminal and said product database, and configured for cooperating with said wireless access terminal to cause the personal mobile wireless devices when in range thereof to transmit signals for identifying the respective consumers, generating consumer position data of the consumers during movement about the store based upon communications from the respective personal mobile wireless devices to the at least one RF receiver device, associating the consumer position data with respective identities of the consumers, cooperating with the product database to associate the consumer identities with respective products potentially viewable by the consumers based upon the consumer position data and product position data, and estimating consumer interest in respective products based upon a duration the consumers spend in a given product area, and initiating consumer-specific advertisements based upon the consumer position data, respective identities of the consumers, and the estimated consumer interest as an electronic message to the respective personal mobile wireless devices.

2. The information processing system of claim 1 further comprising a consumer profile database configured for storing consumer profiles associated with respective consumers; and wherein said processor is configured to initiate the consumer-specific advertisements based upon the respective products potentially viewable by the consumers and their respective consumer profiles.

3. The information processing system of claim 2 wherein the consumer profiles comprise at least one of consumer payment account profiles and consumer reward program profiles.

4. The information processing system of claim 1 wherein said at least one RF receiver comprises a plurality thereof spaced throughout the store; and wherein said processor is operable to determine the positions of the personal mobile wireless devices based upon at least one of an angle of arrival calculation, a time of arrival calculation, and a time difference of arrival calculation.

5. The information processing system of claim 1 wherein said processor is operable to cause the personal mobile wireless devices to transmit at a faster rate when in range.

6. The information processing system of claim 1 wherein said wireless access terminal comprises a wireless local area network (WLAN) access point.

7. The information processing system of claim 1 wherein said wireless access terminal comprises a cellular base station.

8. An information processing system for consumers at a store, at least some of the consumers carrying personal mobile wireless devices and each personal wireless mobile device transmitting signals for identifying the respective consumer, the information processing system comprising:
    a plurality of RF receiver devices arranged about the store for receiving communications from the personal mobile wireless devices;
    a wireless access terminal at the store;
    a product database configured for storing product position data for different products throughout the store; and
    a processor coupled to said plurality of RF receiver devices, said wireless access terminal and said product database, and configured for
        cooperating with said wireless access terminal to cause the personal mobile wireless devices when in range thereof to transmit signals for identifying the respective consumers,
        generating consumer position data of the consumers during movement about the store based upon communications from the respective personal mobile wireless devices to the plurality of RF receiver devices using at least one of an angle of arrival calculation, a time of arrival calculation, and a time difference of arrival calculation,
        associating the consumer position data with respective identities of the consumers,
        cooperating with the product database to associate the consumer identities with respective products potentially viewable by the consumers based upon the consumer position data and product position data, and estimating consumer interest in respective products based upon a duration the consumers spend in a given product area, and
        initiating consumer-specific advertisements based upon the consumer position data, respective identities of the consumers, and the estimated consumer interest as an electronic message to the respective personal mobile wireless devices.

9. The information processing system of claim 8 further comprising a consumer profile database configured for storing consumer profiles associated with respective consumers; and wherein said processor is configured to initiate the consumer-specific advertisements based upon the respective products potentially viewable by the consumers and their respective consumer profiles.

10. The information processing system of claim 9 wherein the consumer profiles comprise at least one of consumer payment account profiles and consumer reward program profiles.

11. An information processing method for consumers at a store, at least some of the consumers carrying personal mobile wireless devices and each personal wireless mobile device transmitting signals for identifying the respective consumer, the method comprising:
    arranging at least one radio frequency (RF) receiver device about the store;
    positioning a wireless access terminal at the store to cause the personal mobile wireless devices when in range thereof to transmit signals for identifying the respective consumers;
    storing product position data for different products throughout the store in a product database;
    receive communications from the personal mobile wireless devices using the at least one RF receiver device;
    generating consumer position data of the consumers during movement about the store based upon communications from the respective personal mobile wireless devices to the at least one RF receiver device;
    associating the consumer position data with respective identities of the consumers;
    associating the consumer identities with respective products potentially viewable by the consumers based upon the consumer position data and product position data;
    estimating consumer interest in respective products based upon a duration the consumers spend in a given product area; and
    initiating consumer-specific advertisements based upon the consumer position data, respective identities of the consumers, and the estimated consumer interest as an electronic message to the respective personal mobile wireless devices.

12. The method of claim 11 further comprising associating respective consumers with consumer profiles; and wherein initiating comprises initiating the consumer-specific advertisements based upon the products potentially viewed by the consumers and their respective consumer profiles.

13. The method of claim 12 wherein the consumer profiles comprise at least one of consumer payment account profiles and consumer reward program profiles.

14. The method of claim 11 wherein the at least one RF receiver comprises a plurality thereof spaced throughout the store; and wherein generating consumer position data comprises determining the positions of the RF identification devices based upon at least one of an angle of arrival calculation, a time of arrival calculation, and a time difference of arrival calculation.

* * * * *